G. E. HOGLUND.
AUTOMATIC VIOLIN.
APPLICATION FILED AUG. 23, 1913.

1,231,739.

Patented July 3, 1917.
7 SHEETS—SHEET 2.

Fig. 2.

Witnesses
Leonard W. Novander
Leonard E. Bogue

Inventor
Gustav E. Hoglund
By Brown, Williams, Bell, Hanson & Boettcher
Attorneys

G. E. HOGLUND.
AUTOMATIC VIOLIN.
APPLICATION FILED AUG. 23, 1913.

1,231,739.

Patented July 3, 1917.
7 SHEETS—SHEET 4.

G. E. HOGLUND.
AUTOMATIC VIOLIN.
APPLICATION FILED AUG. 23, 1913.

1,231,739.

Patented July 3, 1917.
7 SHEETS—SHEET 7.

Witnesses
Leonard W. Novander
Leonard E. Bogue

Inventor
Gustav E. Hoglund
By Brown, Williams, Bell, Hanson & Boettler
Attorneys

UNITED STATES PATENT OFFICE.

GUSTAV E. HOGLUND, OF CHICAGO, ILLINOIS.

AUTOMATIC VIOLIN.

1,231,739.   Specification of Letters Patent.   Patented July 3, 1917.

Application filed August 23, 1913. Serial No. 786,229.

*To all whom it may concern:*

Be it known that I, GUSTAV E. HOGLUND, a citizen of the United States, residing at Chicago, in the county of Cook and State of Illinois, have invented a certain new and useful Improvement in Automatic Violins, of which the following is a full, clear, concise, and exact description, reference being had to the accompanying drawings, forming a part of this specification.

My invention relates to automatic violins, the object of my invention being fundamentally to produce an instrument controlled by a sheet of perforated paper moving over a tracker board to control the playing of a violin and in so doing, to produce as nearly as possible the same effects as are obtained when a violin is played by an expert violinist.

One of the fundamental purposes of my invention is to provide automatic means for controlling a horse hair bow substantially identical with that ordinarily used in playing a violin in such manner as to secure a pleasing tonal quality and in such manner as to secure the requisite musical expression.

To this end, I provide pneumatically operated mechanism for reciprocating the bow across the violin strings, the bow being provided with guiding mechanism to determine its lateral position. The guiding mechanism is controlled by bellows or other pneumatically actuated mechanism to determine the angular position of the bow relative to the set of violin strings.

In order to minimize the angle through which the bow must be shifted in order to bring the horse hair of the bow into contact with the appropriate strings, I have found it desirable to depart from the usual arrangement of the strings upon the bridge and finger board and to permanently elevate or depress alternate strings. The horse hair of the bow is arranged to pass above two of the strings and below the other two. When in its normal position the horse hair will pass between the two pairs of strings without vibrating any of them.

If now, the pneumatic controlling mechanism is actuated to depress the heel end of the bow, the horse hair will engage one of the strings. If, on the other hand, the heel end of the bow is elevated a second string will be engaged. If again, the guiding mechanism at the heel end of the bow remains in its normal position while the tip end of the bow is depressed, a third string will be engaged, and finally, if the tip end of the bow is elevated the fourth string will be engaged.

The mechanism for guiding the bow in order that it may engage the appropriate strings is controlled by a set of perforations in the sheet music which passes across the tracker board. Other perforations controlling suitable pneumatic mechanism determine the longitudinal movement of the bow in conformity with the music being played.

The fingering of the strings is controlled by automatic fingering mechanism operated by pneumatic devices not necessarily unlike those used in the operation of automatic piano players, the fingering mechanism being controlled, like the bowing mechanism, by suitable perforations cut in the roll of music which passes over the tracker board. The fingering mechanism acts in conjunction with the bow guiding mechanism to determine the note to be played while the duration of the several notes is controlled by the mechanism for longitudinally reciprocating the bow in conjunction, of course, with the mechanism for controlling the fingering of the several strings.

These several features of my invention will be more clearly understood by reference to the accompanying drawings, in which—

Fig. 3ª is a cross-sectional view taken on line 3ª—3ª of Fig. 3;

Figure 2:
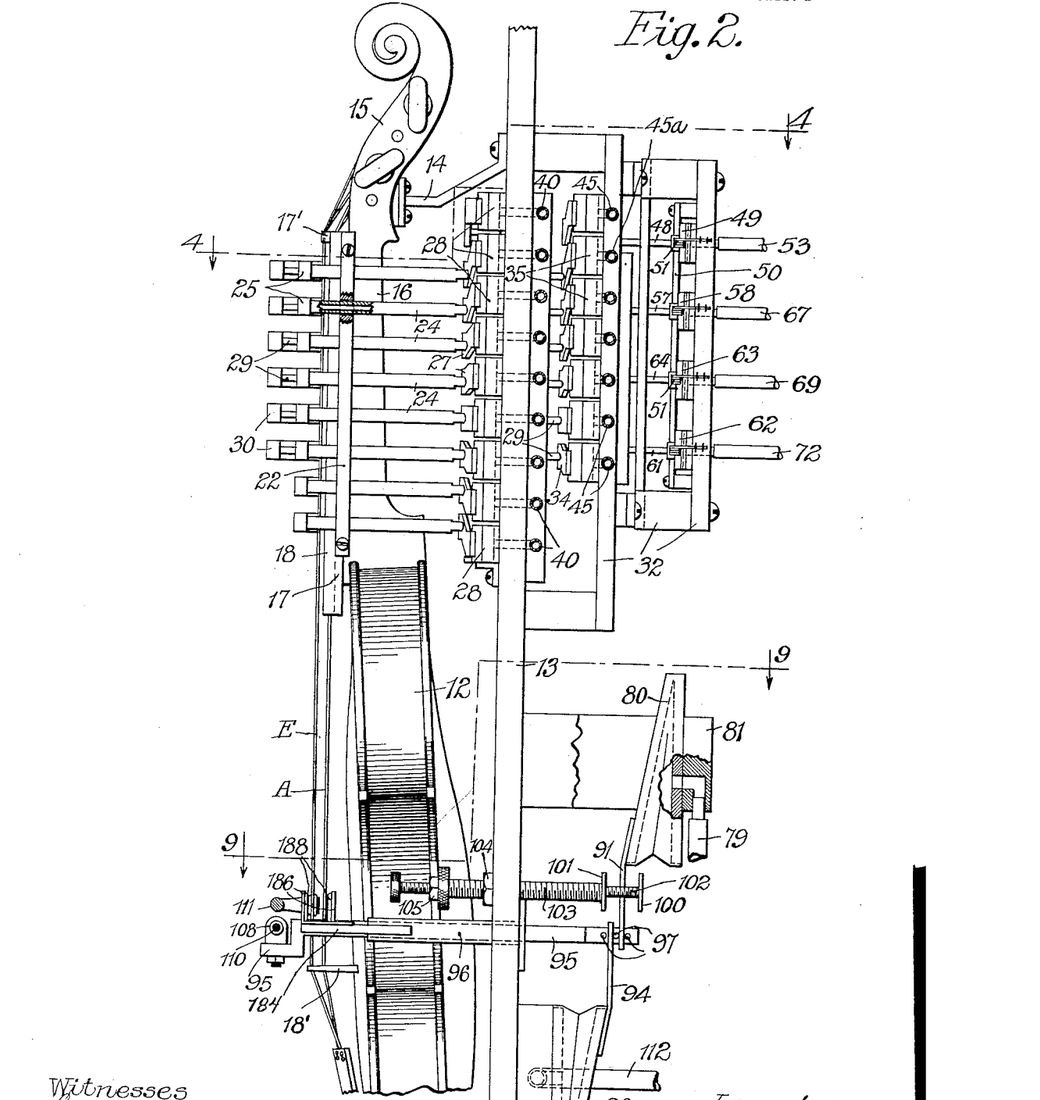
Fig. 2 is a side view of the mechanism shown in Fig. 1.
Figure 4:
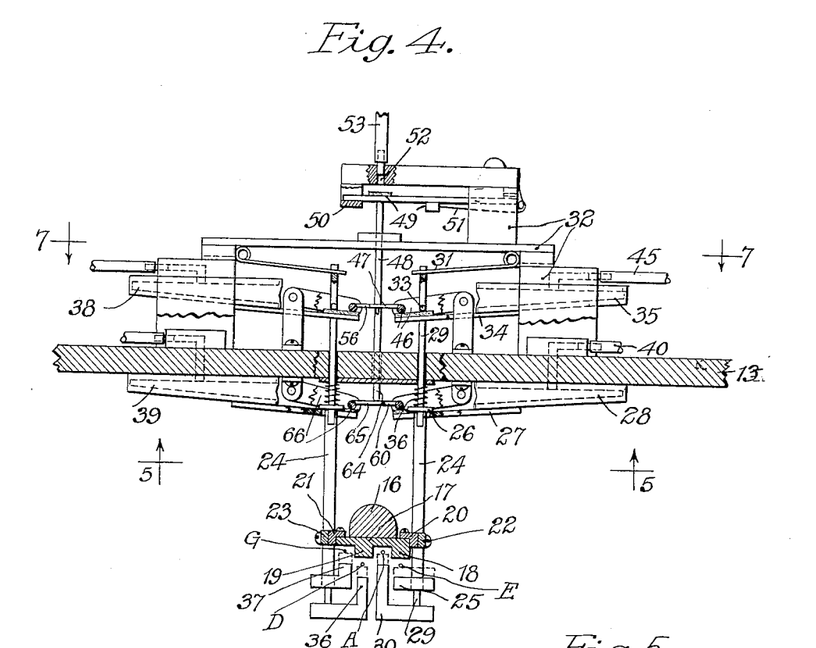
Fig. 4 is a top view of the fingering mechanism taken on line 4—4 of Fig. 2.

Referring now to Fig. 2, it will be noted that the violin 12 is held upon a support 13, by means of an extension 14 which is secured to the head 15, and the lower end of the violin may be secured to this support in any convenient manner. The neck 16 has secured thereto a finger board 17 which, as shown in Fig. 4, is provided with elevated portions 18 and 19. At the top of the finger board 17, there is provided a support 17', which serves to raise each of the strings from the finger board. A bridge 18' is provided with elevations 19' and 20' which are engaged by the "E" and "D" strings, respectively.

Figure 1:
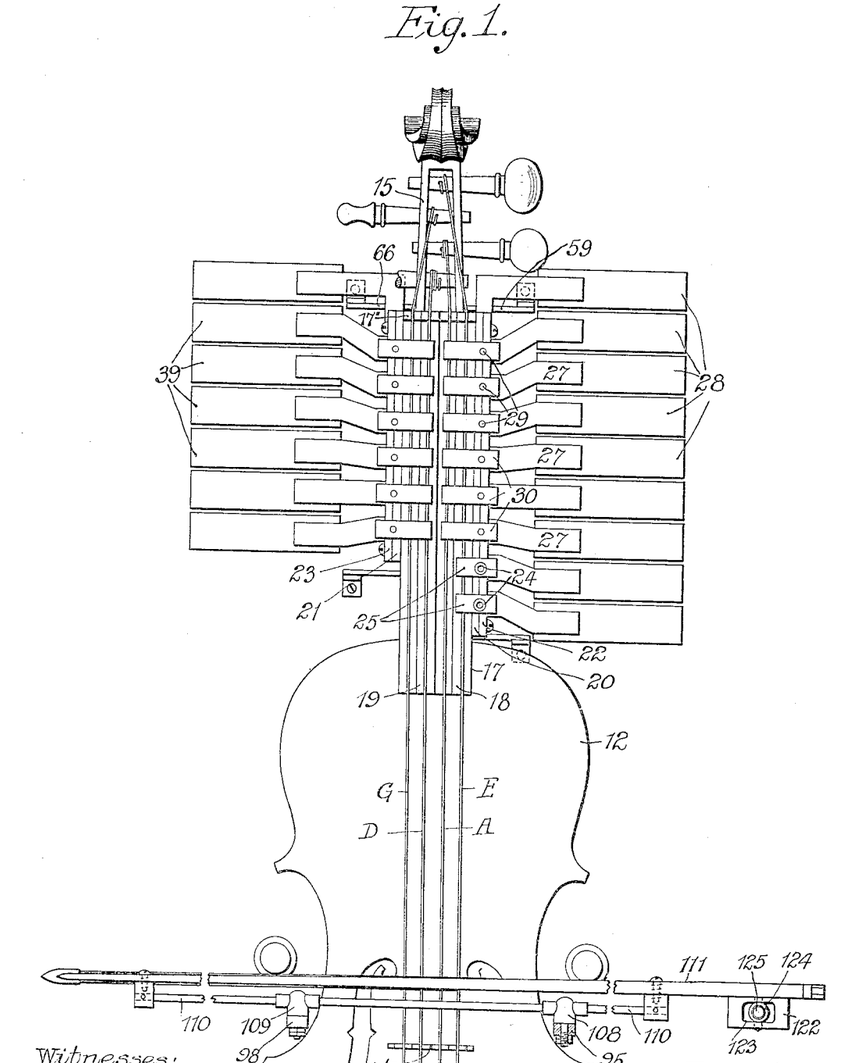
Figure 1 illustrates a violin and associated therewith the embodiments of my invention. In the preferred form of my invention shown in the drawings the violin is vertically and the bow horizontally disposed.

The finger board has secured to the sides thereof a pair of strips 20 and 21, to which are secured strips 22 and 23, respectively. These strips are arranged so as to form guiding means for fingering devices, comprising a tube 24, to which is secured an extension 25 for engaging the particular string upon the operation of other mechanism which will be later described. The inner end of the tube 24 has an enlargement 26, which engages with the bifurcated end of an extension 27 secured to one of a plurality of action bellows 28. The tube 24 surrounds a spindle 29, which has secured thereto an extension 30 so as to engage one of the strings of the violin. As shown in Fig. 4, the spindle 29 passes through the support 13 and has its end slotted so as to receive the end of a spring 31 which is conveniently fastened to the framework 32 at the rear of the support 13. The spindle 29 has arms 33 which are arranged so as to engage the bifurcated end of an extension 34 from the action bellows 35, which are suitably supported from the framework 32. The spring 31 serves to force the spindle 29 to its outermost position, which is limited by the extension 34. A spring 36 acts in a similar way against the enlargement 26 so as to force the tube 24 into its outermost position, and this position is limited by means of the extension 27. As shown particularly in Figs. 1, 2 and 4, it will be noted that the extensions 25 are arranged to press against the "E" string, the extensions 30 coöperate with the "A" string, the extensions 36 are for engagement with the "D" string, and the extensions 37 are adapted to press against the "G" string. The extensions 36 are operated by mechanism identical with the arrangement for the extension 30, comprising a series of action bellows 38, which are suitably mounted upon the framework 32 and which are arranged to be collapsed in a manner which will be hereinafter described. Each of the extensions 37 has associated therewith an action bellows 39, which is mounted upon the support 13, and which action bellows are also arranged to be collapsed when desired. Each of the action bellows 28, as shown in Figs. 2 and 4, is connected, by means of a flexible tube 40, to one of a plurality of primary pneumatics 41, which, in turn, are connected, by means of the tubes 42, to a tracker board 43. This tracker board is provided with an opening for each tube, which is adapted to register with holes in the music sheet 44. It may here be stated that the tracker board and the mechanism for moving the music sheet may be of any well-known construction. Therefore, this mechanism is shown more or less diagrammatically. Associated with the action bellows 35, I have arranged a series of tubes 45 which also lead to the primary pneumatics 41. As shown, connections are also provided from each of the action bellows 38 and 39 to the primary pneumatics 41 in order to secure their operation when desired.

Figures 3, 3A:
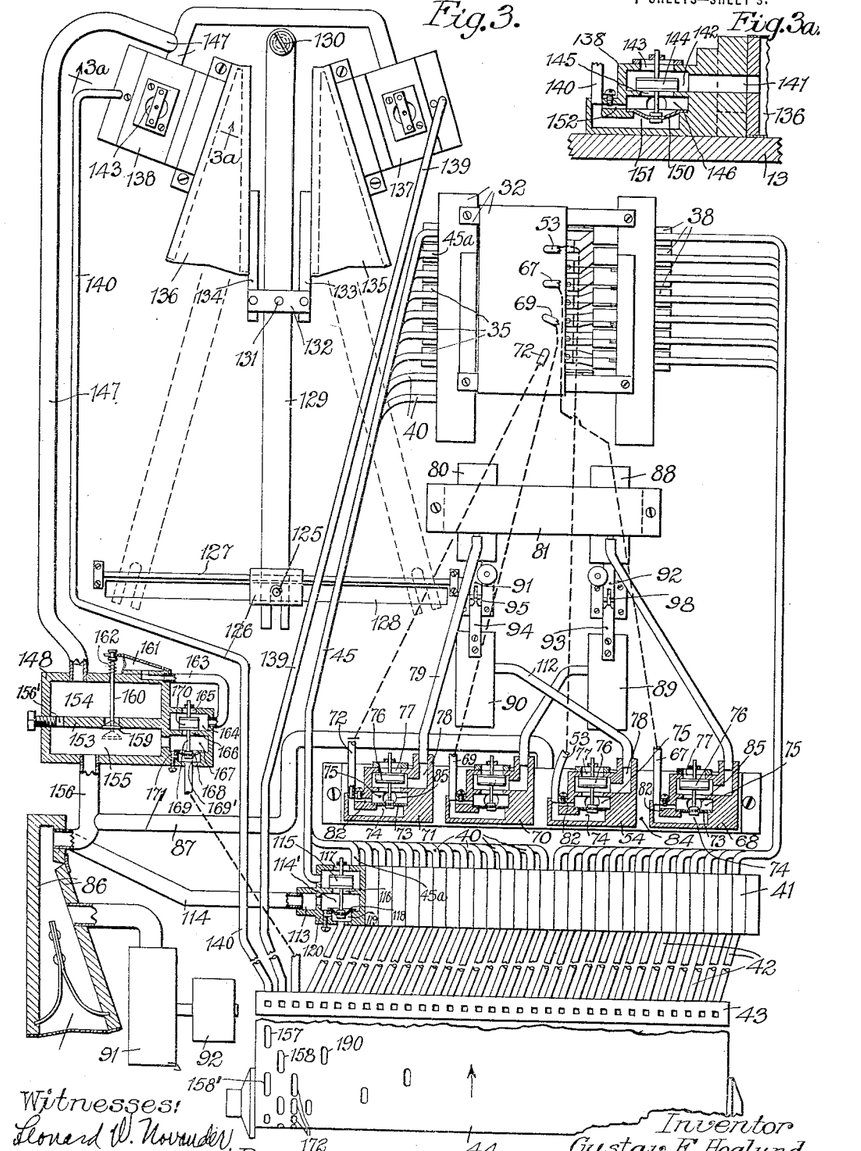
Fig. 3 is a rear view of the mechanism shown in the foregoing figures and in addition, illustrating more or less diagrammatically the tracker board and the various connections therefrom to the mechanism for playing the violin.
Figure 5:
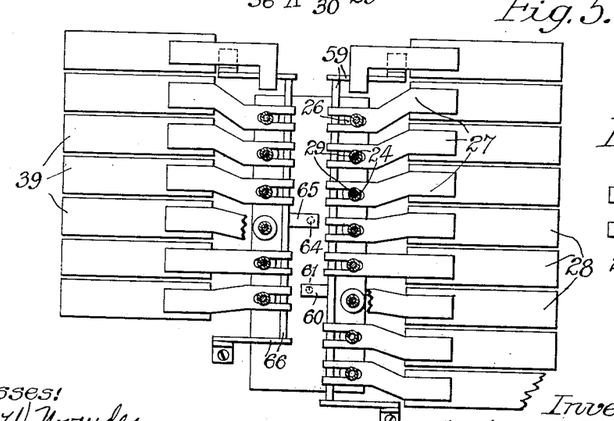
Fig. 5 is a cross-sectional view taken on line 5—5 of Fig. 4.
Figure 6:
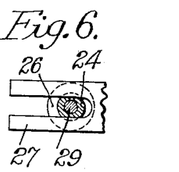
Fig. 6 is an enlarged detailed view showing one form of the engagement between the fingering devices and the action bellows.
Figure 7:
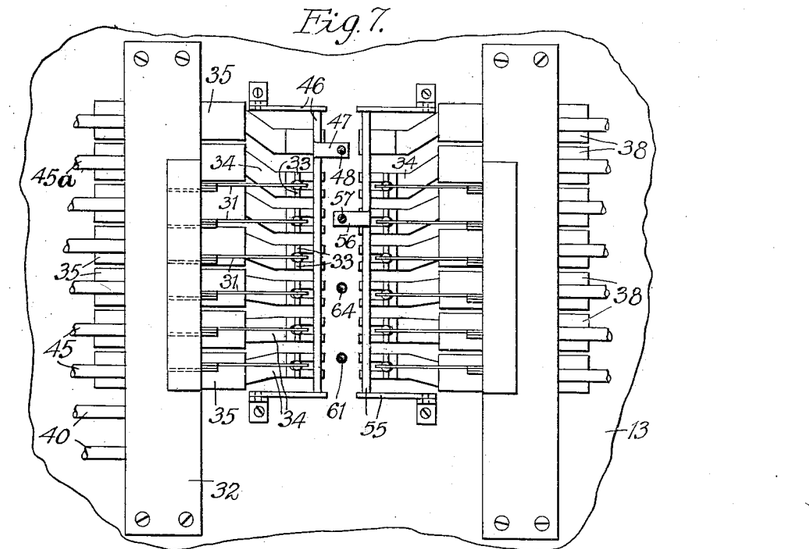
Fig. 7 is a view taken on line 7—7 of Fig. 4.
Figure 8:
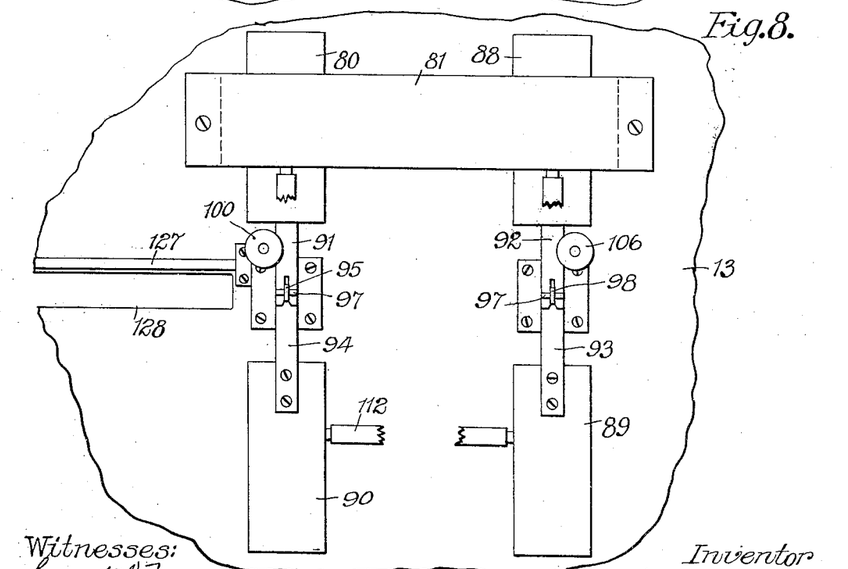
Fig. 8 is a rear view showing the mechanism for placing the bow in position such as to engage any one of the four strings.
Figure 9:
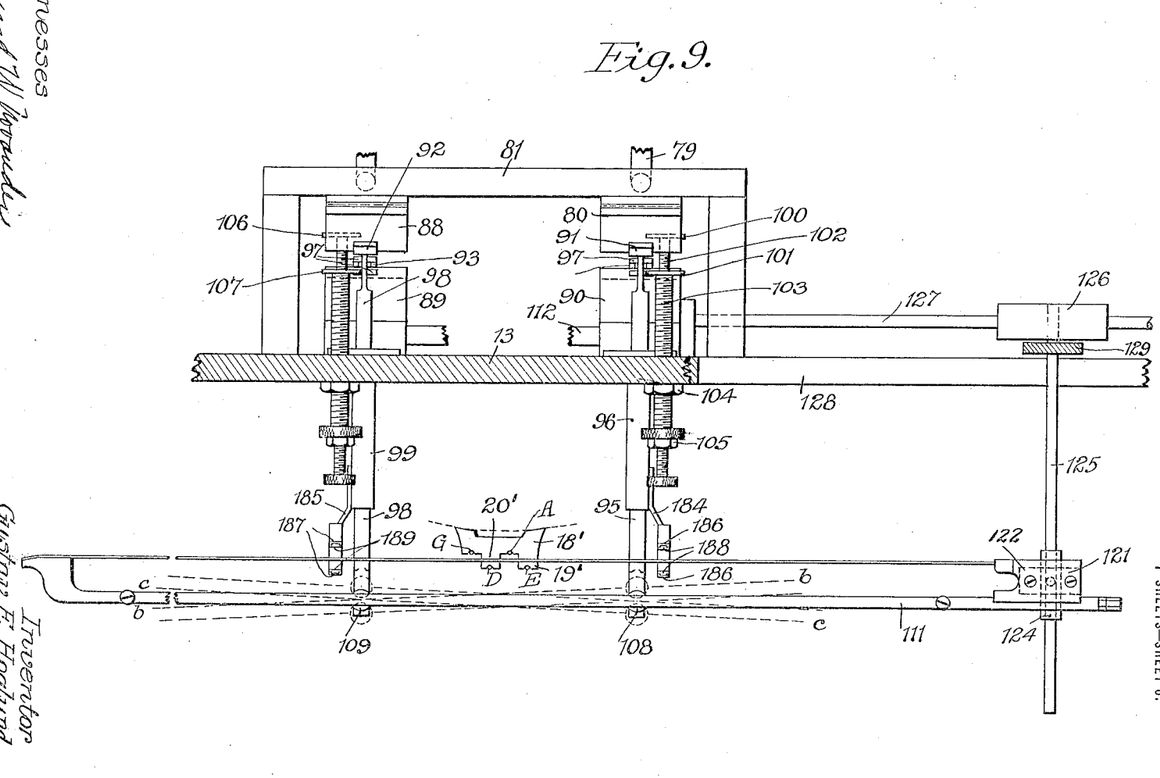
Fig. 9 is a cross-sectional view taken on line 9—9 of Fig. 2.

Referring now more particularly to Figs. 3, 4 and 7, it will be observed that the U-shaped member 46 is pivoted to bearings at each end thereof and is arranged to be engaged by each of the extensions from the action bellows 35, 35. This U-shaped member 46 has an extension 47 which coöperates with a pin 48 supported by the framework 32 and engaging a valve 49 which is normally held against a back-stop 50 by means of a spring 51 held in the framework 32 in any convenient manner. As is shown in Fig. 4, the valve 49 is held away from an opening 52, this opening being connected by means of a tube 53 to a bow-controlling primary pneumatic 54. The spring 51 also serves to normally maintain the U-shaped member against all of the extensions 34. A similar U-shaped member 55 is pivoted so as to be engaged by the extensions from the action pneumatics 38 and provided with an arm 56 which bears against a pin 57 arranged so as to operate a valve 58 similar to the valve 49. As shown in Fig. 5, the action pneumatics 28 are arranged to engage a U-shaped member 59 which is pivoted to the support and has an arm 60 which coöperates with a rod 61 passing through the support 13 and coöperating with valve 62. A valve 63 is controlled by an arm 64 extending through the support 13 and coöperating with an extension 65 from the U-shaped member 66 arranged to be depressed by means of the extensions from the action pneumatics 39. In each instance, as described in connection with the valve 49, there is a spring for maintaining each valve against the back-stop 50 and, in addition, maintaining the U-shaped members in contact with the extensions from the action pneumatics, this arrangement being clearly shown in Figs. 2 and 4. The valve 58 controls an opening which is connected by means of a tube 67, which leads to a bow-controlling primary pneumatic 68. The valve 63 is connected by means of a tube 69 to the bow-controlling primary pneumatic 70. The primary pneumatic 71 is connected, by means of a tube 72, to the opening controlled by the valve 62. As is shown in the drawings, all of the bow-controlling primary pneumatics are similar in construction each having a flexible diaphragm 73 which separates the compartments 74 and 75. The compartment 75 has an opening which is controlled by the valve member 76 arranged so as to close an opening 77 leading to the atmosphere and thus establish connection between the chamber 75 and a compartment 78 connected by means of a tube 79 to an action pneumatic 80 supported upon an extension 81 secured to the support 13. The compartment 74 is directly connected to the tube 72 leading to the opening controlled by the valve 62. A bleed 82 is connected to the compartment 75 and to the passage leading from the compartment 74, this bleed being controlled by a screw so as to vary the size thereof. Each of the compartments 75 of the bow-controlling primary pneumatics 54, 68, 71 and 70 is connected to a wind chest 84 by means of an opening 85. This wind chest is connected to a suction bellows 86, by means of a pipe 87. The action pneumatic 88, supported by the extension 81 is connected to the bow-controlling primary pneumatic 68. The action pneumatics 89 and 90, respectively, are connected to the bow-controlling primary pneumatics 70 and 54, respectively. The air is continually withdrawn from the suction bellows 86 by means of a device 91, which is operated by means of a motor 92. This arrangement, it may be stated, is similar in all respects to that employed in automatic piano players, so that these parts are shown more or less diagrammatically. It will be noted that, inasmuch as the bow-controlling primary pneumatics are in direct connection with the wind chest 84, and since the valves 49, 58, 62 and 63 are normally in open position, that the valve members 76 of each of the bow-controlling primary pneumatics will be forced into a raised position so as to close the openings 77 to the atmosphere, this being by reason of the fact that the pressure in each compartment 75 is considerably less than in the compartment 74, so that the flexible diaphragm is raised, thus bringing the valve member in each instance up so as to normally close the opening to the atmosphere. It will thus be noted that the pressure in each of the action pneumatics 80, 88, 89 and 90 is the same, so that they will normally be held in a neutral position such as shown in Figs. 2 and 9.

These action pneumatics are provided with bifurcated extensions 91, 92, 93 and 94, respectively. The extensions 91 and 94 engage with the member 95, which is supported in a tube 96 held in the support 13. Pins 97, 97 are carried by the member 95 and are engaged by the extensions so as to cause the proper reciprocation of the member 95 when either one of the action pneumatics 80 and 90 is operated. The extensions 92 and 93 engage in a similar manner with a member 98 which is arranged to be reciprocated in a tube 99, held in the support 13. These action pneumatics determine the position which the bow will occupy with relation to any one of the strings and, in order to limit the movement, I have arranged a pair of disks 100 and 101 which are secured to threaded members 102 and 103, respectively, carried by the support 13. The disks limit the movement in each direction of the extension 91 and thereby limit the movements of the member 95. The threaded members 102 and 103 are provided with knurled heads at their front ends so as to provide means for positioning the disks 100 and 101. Lock nuts 104 and 105 are also provided so as to maintain the disks in a certain relative position. The movements of the extension 92 are limited in a similar manner by means of disks 106 and 107, which are arranged to be moved in a manner similar to the previous mentioned disks. The members 95 and 98 are connected at their front ends to pivoted members 108 and 109, respectively. These members slidably engage with a rod 110 carried by the bow 111. Normally, the horse hair of the bow 111 is held midway between the strings, as shown in Figs. 2 and 9, that is to say, two strings will occupy a position behind the horse hair of the bow and the other two will be in front thereof so that in case the bow is reciprocated while it is in this position, no engagement will ensue between the horse hair of the bow and any one of the strings. The angular position of the bow, as has been stated before, is controlled by the valves 49, 58, 62 and 63, which in turn are controlled by the pneumatically actuated U-shaped members associated therewith. For example, if one of the action pneumatics 35 is collapsed, owing to the registering of a hole in the music sheet with a hole in the tracker board, the U-shaped member 46 will be rotated so as to close the valve 49 against the opening 52 and, since the tube 53 leading therefrom to the bow-controlling primary pneumatic 54 is connected to the compartment 74, which previously was connected to atmosphere and is now connected only to the compartment 75 through the bleed 82, the pressure in the compartment 74 will be considerably reduced, thus allowing the valve 76 to drop, whereupon communication is established from the atmosphere through the channel 78, through the tube 112 and the action pneumatic 90. This will permit the action pneumatic 90 to open and the action pneumatic 80 to collapse owing to the pressure in said action penumatic 80 being considerably less than in the action pneumatic 90, since the action pneumatic 80 is connected directly with the air chest 84. This will cause the bow to be drawn in by means of the member 95 until the extension 91 engages with the disk 100, and, since there is no movement of the member 98, the bow will thus engage with the "A" string. The other three strings are engaged by the bow when any one of the other three pneumatics 88, 89 and 90 is allowed to collapse.

The primary pneumatics 41, which are connected to the tracker board 43, have communicating therewith an air chest 113 which is connected by means of the pipe 114 to the suction bellows 86, so that the air is continually withdrawn from this air chest and, inasmuch as it is connected to each of the primary pneumatics, the air will be below atmospheric pressure in each compartment 114′ when the valve members 115 are down, closing the openings 116. Each pneumatic is provided with an opening 117 leading to the atmosphere. The valve member 115 in each case is connected at its lower end to a flexible diaphragm 118 which separates the compartment 119 from the compartment 114′. A bleed 120 establishes communication between the two compartments. A flexible tube 42 connects the compartment 119 in each of the primary pneumatics with an opening in the tracker board 43 and, when an opening in the music sheet registers with the opening in the tracker board, the air pressure in the compartment 119 will become suddenly greater, whereupon the flexible diaphragm will be forced upwardly so that the valve member 115 will close the opening to the atmosphere and establish communication between the wind chest 113 through the chamber 114′ and the flexible tube 45 leading up to the topmost action pneumatic 35, which will thereupon collapse and cause a rotation of the U-shaped member 46 associated therewith and, at the same time, close the valve 49 so as to bring the bow into engagement with the "A" string.

I shall now proceed to a description of the mechanism for reciprocating the bow, it being understood, of course, that the fingering devices which are arranged to engage with each string are first pressed against the particular string with which the action pneumatic is associated and which has been collapsed and, then, the bow is reciprocated to sound the note after which air is admitted to the action pneumatic, thus permitting the spring coöperating therewith to restore it to its normal position. The bow 111 has secured to the frog 121 a member 122 provided with an opening 123. The member 122 has pivoted thereto a sleeve 124, passing through the opening, and loosely engages with a rod 125 which is secured to a crosshead 126 adapted to ride on a rod 127. The rod 125 passes through a slot 128 in the support 13 and is engaged by a bifurcated arm 129 which extends upwardly and is pivoted at 130 to the support. At 131, there is pivoted a double link 132, each end being pivoted to arms 133 and 134, secured to bow-reciprocating bellows 135, 136, respectively, mounted upon the support 13. The bellows 135 and 136 have pneumatics 137 and 138, respectively, connected therewith and tubes 139 and 140 lead to openings in the tracker board. Each of the pneumatics is constructed as shown in Fig. 3ª, that is to say, there is a passage 141 leading from the bellows to a compartment 142 which normally communicates with atmosphere through an opening 143. A valve member 144 normally closes an opening 145 communicating with the compartment 146, this compartment being connected by means of a pipe 147 to a device 148 for controlling the speed of operation of the bow-operating mechanism. A spindle 149 connects the valve member 144 with a flexible diaphragm 150, which separates the compartment 151 from the compartment 146. The compartment 151 is connected, by means of a channel to the flexible tube 140 and a bleed 152 connects this channel with the compartment 146, the size of this bleed being controlled by means of a screw, as shown. The accelerating device 148 has a partition 153, which separates the compartment 154 from another compartment 155. A pipe 156 leads from the compartment 155 to the suction bellows so that the air is constantly withdrawn from this compartment as well as from the compartment 154, through an opening 156′ and, consequently, air is normally at a low pressure in the compartments 151 in each pneumatic. When an opening in the music-sheet registers with either one of the holes in the tracker board connected with the pneumatics 137 and 138, that one will be operated. For example, when the opening 157 registers with the opening in the tracker board, air will be admitted through the tube 140 and, consequently, the pressure in the compartment 151 will be greater than in the compartment 146, which will cause the diaphragm to be raised, thus lifting the valve member 144 to close the opening 143 and establish communication between the compartment 146 and the channel 141, thus withdrawing the air from the bellows 136 and thereupon causing the arm 129 to be drawn toward the left to the position shown in dotted lines, and, after arriving at this position, the opening 157 will have passed out of registration with its corresponding opening in the tracker board and the opening 158 will register with the opening associated with the tube 139, whereupon the valve member 144 connected with the bellows 136 will drop and permit atmospheric air to enter said bellows and the valve member associated with the bellows 135 will be raised in a manner similar to that just described, so that the bellows 135 will collapse, thus drawing the arm toward the right to the position shown in dotted lines. This reciprocation will continue as long as there are openings in the music sheet which register with openings in the tracker board.

In order to quicken the bow action, I have an arrangement associated with the accelerating device which comprises a valve 159 which closes an opening in the partition 153. A spindle 160 is connected with the valve 159 and has its outer end connected with a pneumatic 161. A spring 162 normally forces the pneumatic into its open position and this pneumatic is connected by means of a tube 163 to a chamber 164 which normally has communication to the atmosphere through the opening 165 and there is an opening 166 connecting the chamber 164 with a compartment 167 which communicates with the compartment 155. The flexible diaphragm 168 is mounted on the spindle 169 secured to a valve member 170, which normally closes the opening 166. The flexible diaphragm 168 separates the compartment 167 from the compartment 169', communicating with an opening in the tracker board by means of a suitable flexible tube. A bleed 171 forms communication between the two compartments 167 and 169' so that, when the music sheet closes the opening in the tracker board, the pressure in the compartments 167 and 169' will become the same, that is to say, the suction bellows will draw the air from the compartment 169' and the tube through the bleed, which is controlled by means of a set screw so as to vary the size thereof. When a piece of music is being played and it is desired that the bow action be increased, an opening or series of openings 172 are arranged to register with openings in the tracker board, thus allowing the air, at atmospheric pressure, to flow into the compartment 169' whereupon the diaphragm will be raised owing to the reduced pressure in the compartment 167 and, thus, the valve member 170 will be carried upward so as to close the opening 165 and, at the same time, communication is established through the opening 166 and compartment 164 and through the tube 163 with the pneumatic 161, thus collapsing said pneumatic and forcing the valve 159 into an unseated position, as shown in dotted lines, whereupon there is a greater amount of air being exhausted from the tube or pipe 147 so as to cause a quicker action of the bellows 135 and 136.

Figure 10:
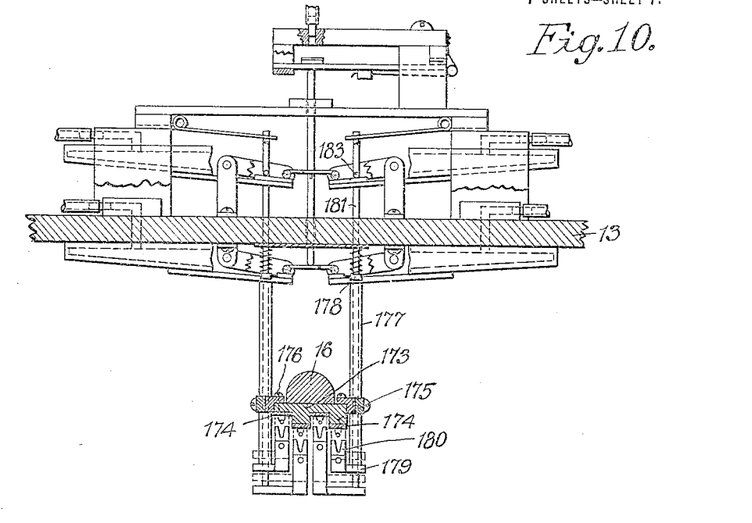
Fig. 10 is a view of a modified arrangement of the fingering mechanism.
Figure 11:
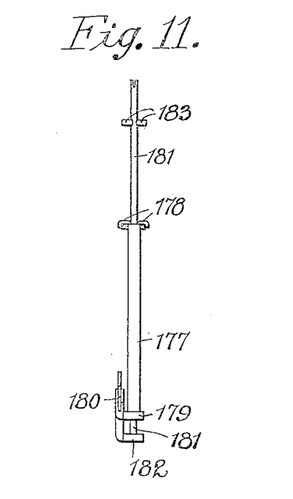
Fig. 11 is a side view of one of the fingering devices shown in Fig. 10.

Referring now to Figs. 10 and 11, I have shown a modified form of finger board and fingering mechanism. The action pneumatics and other mechanism for each of the fingering devices is identical with that just described. The finger board 173 is secured to the neck of the violin, as stated before, and is provided with soft rubber facings 174 on the elevated portions 175 and also on the depressed portions 176. The fingering devices comprise a tube 177 which is adapted to slide in a support extending from the finger board and the inner end of this tube has members 178 for engagement with an extension from one of the action pneumatics. The outer end of this tube is provided with an extension 179 which carries a fiber member 180 which is bifurcated and which, when it is in the position, illustrated in dotted lines, engages a string and at the same time engages the facing 174. The tube 177 carries a rod 181 slidable within said tube and provided with an extension 182 at its outer end arranged so as to engage with a second string by means of a bifurcated member similar to the one just described. The rod 181 is provided with members 183 adapted to engage an extension from an action pneumatic, and the end of this rod is slotted so as to be engaged by a spring so as to force it into its outermost position. It will be observed that in this modification instead of having the fingering mechanism merely engage each string, each of the jaw members engages the string, as well as the facing on the finger board.

It will be noted from Figs. 5 and 7 that the topmost action pneumatics of each set do not have fingering devices associated therewith, but the extensions from these action pneumatics merely engage with the U-shaped members so that, when any one of these action pneumatics is collapsed, the corresponding one of the pneumatics 80, 88, 89, and 90 will be operated in a manner heretofore described. These action pneumatics are for the purpose of sounding notes on the open strings so that, after any one has been collapsed, the bow will be forced against the corresponding string and then drawn by means of the bow reciprocating bellows so as to sound the particular note desired.

As shown particularly in Fig. 9, it will be observed that the tubes 96 and 99 have extending therefrom supports 184 and 185 which have upwardly extending portions 186 and 187, respectively, (Fig. 2) forming holders for rosin 188 and 189, the idea being that when the bow is thrown into engagement with a string and drawn across the same, the side of the bow opposite the engaged string will engage with the rosin and become coated therewith. The rosin is positioned so that, for each engagement of the bow with any one string, there will be a corresponding engagement of the horse hair of the bow with the rosin.

The operation of my device is as follows: In case the bow has been placed in an intermediate position, a hole 157 is provided in the music sheet 44 so that, as this music sheet is wound from one roll to another, in the direction as shown by the arrow in Fig. 3, this opening will register with an opening in the tracker board 43, whereupon the air will be admitted to the compartment 151 of the primary pneumatic 138 and, since the air pressure is considerably less in the compartment 146, the valve member 144 will be raised and communication will be established from the bow reciprocating bellows 136, through the channel 141, through compartment 146, through pipe 147 and through the compartment 154, opening 156', compartment 155, through the pipe 156 and into the suction bellows, which forces the arm 129 into the extreme left-hand position, thus drawing the bow to its extreme right-hand position when looking at Fig. 1. The bow has not as yet engaged any one of the strings, but has been merely forced into a position ready to engage any one of the strings upon the operation of any one of the pneumatics 80, 81, 89 or 90. As the music sheet continues to move across the tracker board, an opening 190 will register with an opening in the tracker board and thereupon cause the valve member of the primary pneumatic associated therewith to be raised so that the air will be withdrawn from the tube 45ª, and also from the action pneumatic 35 connected therewith, thereby causing this pneumatic to be collapsed, and at the same time the extension 34 will cause the U-shaped member 46 to be rotated and thus the valve 49 will close the opening 52. At the same time, the rod 29 will be drawn inward against the tension of the spring 31 and, consequently, force the extension 30 against the "A" string without, however, moving the tube 24. Immediately following this action the air is withdrawn from the compartment 74 of the bow-controlling primary pneumatic 54, through the bleed 82, which causes the valve member 76 to drop and the pneumatic 90 communicates with the atmosphere through the passage 78. Consequently, since there is a very much reduced air pressure in the pneumatic 80, this pneumatic will collapse, whereupon the extension 91 will act against the pins 97 to force the member 95 out so as to cause the horse hair of the bow to engage with the "A" string, that is to say, the bow will occupy a position represented by the line b—b, owing to the fact that the member 98 is held in a neutral position by means of the pneumatics 88 and 89, it being remembered, of course, that the bow has been drawn completely to its extreme right-hand position when looking at Fig. 9. After the bow has been placed in engagement with the "A" string, the opening 158 in the music sheet will register with an opening in the tracker board, whereupon the air will be admitted to the primary pneumatic 137 so as to cause the bow to be drawn from the position, as shown in dotted lines at the left of Fig. 3, to the other position shown in dotted lines. After the bow has completed its movement in one direction, there will be a corresponding movement in the other direction, it being remembered that each reciprocating bellows is alternately opened and closed to the atmosphere during the reciprocation of the bow.

When an opening in the music sheet registers with an opening in the tracker board which will cause one of the action pneumatics 28 to collapse (excepting the top one), the extension from this pneumatic will force the extension 25 down against the "E" string and, at the same time, the U-shaped member 59 will be rotated so as to cause the arm 60 to actuate the valve 62, whereupon the valve member 76 associated with the primary pneumatic 71 will drop, thereby allowing atmospheric air to pass through the opening 77, passage 78 and tube 79 and into the pneumatic 80, so that the air pressure will be greater in this pneumatic than in the pneumatic 90, whereupon the last-named pneumatic will collapse, forcing the bow into the position represented by the line c—c by reason of the fact that the pneumatics 88 and 89 do not change their positions, but merely hold the member 98 in an intermediate position, while the pneumatic 90 has forced the bow outward and, then, as the bow is reciprocated, a note will be sounded on the "E" string. After the sounding of the note, the bow is withdrawn from the string, and the action pneumatic is simultaneously restored to its normal position. The same operation is carried out when any note is played upon either the "D" or "G" strings, except that the pneumatics 88 and 89 are operated in a similar manner to that just described in order to place the bow in different angular positions so as to obtain the desired engagement of the bow with each string. At the same time, the pneumatics 80 and 90 are inert or in their neutral position.

From the foregoing description it will be seen that the music sheet determines the note to be played, and the actuation of any one of each set of action pneumatics causes the bow to be forced into engagement with the particular string upon which a note is to be played; that is, each string has a set of action pneumatics and mechanism coöperating therewith so that when any one of said action pneumatics is collapsed there will follow an engagement between the bow and the corresponding string. After the bow is in engagement with a string, it will be drawn over the same, the length of the note, of course, being determined by the perforation in the music sheet.

While I have herein described the improved features of my invention, I do not wish to be limited to the precise arrangement shown, inasmuch as it will be apparent to those skilled in the art that modifications may be made without departing from the spirit and scope of my invention.

I claim as new and desire to secure by Letters Patent:

1. An automatic violin comprising in combination, a support, a violin secured thereto, a pluralty of strings carried by the violin, a bow for the violin, fingering devices for each of the strings of the violin, means for causing an engagement between each fingering device and its associated string, devices controlled by the said means for causing the bow to engage the desired string, and means for drawing the bow across the engaged string.

2. An automatic violin comprising in combination, a support, a violin secured thereto, a plurality of strings carried by the violin, a reciprocating bow for the violin, fingering devices for each of the strings, means for causing an engagement between each fingering device and its associated string, devices controlled by the said means for causing the bow to engage the desired string, and mechanism for drawing the bow across the engaged string.

3. An automatic violin comprising in combination, a support, a violin secured thereto, a plurality of strings carried by the violin, a bow for the violin, fingering devices for each of the strings, pneumatic means for causing an engagement between each fingering device and its associated string, devices controlled by said means for causing the bow to engage the desired string, and pneumatic mechanism for drawing the bow across the engaged string.

4. An automatic violin comprising in combination, a support, a violin secured thereto, a plurality of strings carried by the violin, a bow for the violin, fingering devices for each of the strings, pneumatically operated means for pressing each fingering device against its associated string, devices controlled by said means for causing the bow to engage the desired string, and mechanism for drawing the bow across the engaged string.

5. An automatic violin comprising in combination, a support, a violin secured thereto, a plurality of strings carried by the violin, a bow for the violin, fingering devices for each of the strings, pneumatically operated means for causing an engagement between each fingering device and its associated string, devices for normally maintaining the bow away from the strings, and operated by the said pneumatically controlled means for forcing the bow into engagement with any one of the strings, and means for reciprocating the bow.

6. An automatic violin, comprising in combination, a support, a violin secured thereto, a plurality of strings carried by the violin, a bow for the violin, fingering devices for each of the strings, a tracker board, a music sheet for said tracker board provided with openings adapted to register with openings in the tracker board, action bellows for operating said fingering devices and controlled in operation by the music sheet, means controlled by the action bellows for causing the bow to engage the desired string, and pneumatic devices controlled by said music sheet for reciprocating the bow.

7. An automatic violin comprising in combination, a support, a violin secured thereto, a plurality of strings carried by the violin, a bow for the violin, fingering devices for each of the strings, a tracker board, a music sheet for said tracker board provided with openings adapted to register with openings in the tracker board, action bellows for operating said fingering devices and controlled in operation by the music sheet, means controlled by the action bellows for causing the bow to engage the desired strings, pneumatic devices controlled by said music sheet for reciprocating the bow, and means for changing the speed of operation of the bow reciprocating devices.

8. An automatic violin comprising in combination, a support, a violin secured thereto, a plurality of strings carried by the violin, a bow for the violin, fingering devices for each of the strings, a tracker board, a music sheet for said tracker board provided with openings adapted to register with openings in the tracker board, action bellows for operating said fingering devices and controlled in operation by the music sheet, means controlled by the action bellows for causing the bow to engage the desired strings, pneumatic devices controlled by said music sheet for reciprocating the bow, and means controlled by the music sheet for changing the speed of operation of the bow reciprocating devices.

9. An automatic violin comprising in combination, a support, a violin secured thereto, a plurality of strings carried by the violin, a bow for the violin, a set of engaging devices for engaging each string, a pneumatic for operating each of the engaging devices, a primary pneumatic for each of the first mentioned pneumatics, suction bellows connected to said primary pneumatics, means for withdrawing the air from said suction bellows, a tracker board, a music sheet for said tracker board provided with openings adapted to register with the openings in the tracker board, connections from said tracker board openings to said primary pneumatics, bow reciprocating bellows communicating with openings in said tracker board so as to be controlled by openings in said music sheet, and means controlled by the first mentioned pneumatics for causing the bow to selectively engage any one of the strings.

10. An automatic violin comprising in combination, a support, a violin secured thereto, a plurality of strings carried by the violin, a bow for the violin, a set of engaging devices for each string, a pneumatic for operating each of the engaging devices, a primary pneumatic for each of the first mentioned pneumatics, suction bellows connected to said primary pneumatics, means for withdrawing the air from the suction bellows, a tracker board, a music sheet for said tracker board provided with openings adapted to register with openings in the tracker board, connections from said tracker board openings to said primary pneumatics, bow reciprocating bellows communicating with openings in said tracker board so as to be controlled by openings in said music sheet, and devices controlled by the first mentioned pneumatics for normally maintaining the bow in a position away from the strings and for pressing the bow against any one of the strings.

11. An automatic violin comprising in combination, a support, a violin secured thereto, a plurality of strings carried by the violin, a bow for the violin, a set of engaging devices for engaging each string, a pneumatic for operating each of the engaging devices, a primary pneumatic for each of the first mentioned pneumatics, suction bellows connected to said primary pneumatics, means for withdrawing the air from the suction bellows, a tracker board, a music sheet for said tracker board provided with openings adapted to register with openings in the tracker board, connections from said tracker board openings to said primary pneumatics, bow reciprocating bellows communicating with openings in said tracker board so as to be controlled by openings in the music sheet, devices controlled by the first mentioned pneumatics for normally maintaining the bow in a position away from the strings and for pressing the bow against any one of the strings, and means for limiting the movement of said devices.

12. An automatic violin comprising in combination, a support, a violin secured thereto, a plurality of strings carried by the violin, a bow for the violin, a plurality of fingering devices for engaging each string, a pneumatic for operating each of the fingering devices, a primary pneumatic for each of the first mentioned pneumatics, suction bellows connected to said primary pneumatics, a tracker board, a music sheet for said tracker board provided with openings adapted to register with openings in the tracker board, connections from said tracker board openings to said primary pneumatics, bow reciprocating bellows communicating with openings in said tracker board so as to be controlled by openings in said music sheet, means connecting said bellows with the bow, and devices controlled by the first mentioned pneumatics for normally maintaining the bow in a position away from the strings and for pressing the bow against any one of the strings.

13. An automatic violin comprising, a support, a violin secured thereto, a plurality of strings carried thereby, means for supporting the strings in two different planes parallel to the plane of the face of the violin, a bow whose horse hair extends between the above mentioned planes of the strings, means for drawing the bow, and devices for tipping the bow so as to engage any of the strings.

14. An automatic violin comprising, a four stringed violin, means for supporting two of the strings in a plane parallel to the plane of the face of the violin, means for supporting the other two strings in a second plane parallel to the plane of the first mentioned pair of strings, a bow whose horse hair extends between the pairs of strings, means for reciprocating the bow, and devices for tipping the bow so as to engage any of the strings.

15. An automatic violin comprising in combination, a support, a four-stringed violin secured thereto and provided with a finger board having two longitudinal ridges, a string support and a bridge for the violin strings, each provided with elevated portions in alinement with the ridges, a bow, means for maintaining the horse hair of the bow normally in a position above two strings and below the other two strings, fingering devices for each string, a tracker board, a music sheet for said tracker board provided with openings adapted to register with openings in the tracker board, means controlled by the music sheet for operating said fingering devices, means controlled by said music sheet for maintaining said bow in normal position away from the strings and to force said bow into engagement with any one thereof, and means for reciprocating said bow, said means being controlled by the music sheet.

16. An automatic violin comprising in combination a support, a four stringed violin secured thereto and provided with a finger board having two longitudinal ridges, a string support and a bridge holding two of the strings in one plane over the ridges and the other two in a second plane over the finger board adjacent the ridges, a bow extending between the first two strings and the said other two strings, fingering mechanism for the strings, means for operating said fingering mechanism, and means for drawing the bow across the strings.

17. An automatic violin comprising in combination a support, a four-stringed violin secured thereto and provided with a finger board having two longitudinal ridges, a string support and a bridge holding two of the strings in one plane over the ridges and the other two in a second plane over the finger board adjacent the ridges, a bow extending between the first two and the said other two strings, mechanism for maintaining the bow normally out of engagement with the strings and for causing engagement between the bow and the desired string, fingering devices for the strings, means for operating the fingering devices, and means for reciprocating the bow.

18. An automatic violin comprising in combination a support, a four-stringed violin mounted thereon, a finger board having two longitudinal ridges, a string support and a bridge holding two of the strings in one plane over the ridges and the other two in a second plane over the finger board adjacent the ridges, bifurcated fingering devices adapted when actuated to engage said strings and finger board, means for actuating said fingering devices, a bow, and mechanism for moving said bow over any of the strings.

19. An automatic violin comprising in combination a support, a four-stringed violin mounted thereon, a finger board having two longitudinal ridges, a string support and a bridge holding two of the strings in one plane over the ridges and the other two in a second plane over the finger board adjacent the ridges, bifurcated fingering devices adapted when actuated to engage said strings and finger board, action pneumatics for operating the fingering devices, means for collapsing said action pneumatics to force the fingering devices against the strings and board, a bow, and mechanism for moving said bow over any of the strings.

20. An automatic violin comprising in combination, a support, a violin mounted thereon, a plurality of strings carried by the violin, fingering devices for the strings, a bow, a rod secured thereto, a pair of members having sliding engagement with said rod, pneumatics connected with the members, means for causing the actuation of said pneumatics to shift the bow to engage the desired string, and means for drawing the bow across the engaged string.

21. An automatic violin comprising in combination, a support, a violin mounted thereon, a plurality of strings for the violin, fingering devices for the strings, a bow, a rod secured thereto, a pair of members having sliding engagement with said rod, pneumatics connected with the members, means for causing the actuation of said pneumatics to shift the bow to engage the desired string, means for reciprocating said bow, and devices for limiting the shifting of the arms.

22. An automatic violin comprising in combination, a support, a four stringed violin mounted thereon, a finger board having four finger stops for the violin two of which are elevated, a support and a bridge for the strings provided with elevated portions corresponding with the finger stops, bifurcated fingering devices adapted when actuated to engage said strings and finger stops, action pneumatics for operating said fingering devices, a tracker board, a music sheet for causing said action pneumatics to collapse to force the fingering devices against the strings and stops, a bow, a rod secured thereto, a pair of members having sliding engagement with said rod, an arm pivoted to each member, two oppositely acting bellows connected with each of said arms for shifting the arms, a pneumatic for each of the bellows controlled by the action pneumatics, suction bellows for reducing the air pressure in said aforesaid bellows so that normally the air pressure in each is the same, the operation of a pneumatic causing its associated bellows to expand and the oppositely acting bellows to collapse to force the bow against a string, and devices for reciprocating the bow.

23. An automatic violin comprising a violin provided with strings, a bow, pneumatics for operating the bow to produce vibration of the strings, a vacuum chamber communicating with the pneumatics, means for withdrawing air from the chamber, and devices controlled by the music sheet for regulating the amount of vacuum produced within the chamber.

24. An automatic violin comprising a violin provided with strings, a bow for vibrating the strings, means for reciprocating the bow, a tracker board, a music sheet coöperating therewith, and devices controlled by the music sheet for changing the speed of operation of the reciprocating means.

In witness whereof, I hereunto subscribe my name this 21st day of August, A. D., 1913.

GUSTAV E. HOGLUND.

Witnesses:
LESLIE W. FRICKE,
ALBIN C. AHLBERG.